Patented Feb. 17, 1942

2,273,181

UNITED STATES PATENT OFFICE 2,273,181

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application July 7, 1941, Serial No. 401,375

4 Claims. (Cl. 252—344)

This invention relates primarily to the treatment of emulsions of mineral oil and water, such as petroleum emulsions, for the purpose of separating the oil from the water.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The demulsifier or demulsifying agent employed in our process, consists of a quaternary compound of the pyridine series of the kind hereinafter described in detail. Members of the pyridine series suitable as reactants include pyridine, alkylated derivatives of pyridine, particularly alkylated derivatives in which the alkyl radical contains three carbon atoms or less, and especially methylated pyridines, i. e., pyridines in which one, two, or three methyl groups have been substituted in the nucleus, such as picolines, lutidines and collidines. Also suitable as reactants are the comparable quinolines and isoquinolines, along with C-methyl homologs thereof. Coal tar bases represent mixtures of suitable heterocyclic materials which may be used as such, or after suitable purification, without separation into the individual components.

Specifically, then, the compounds herein contemplated as demulsifiers consist of the quaternary nitrogen products obtained by reacting hydroxy compounds of the formula

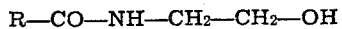
R—CO—NH—CH₂—CH₂—OH in which RCO denotes an acyl radical derived from a detergent-forming monocarboxy acid, with a heterocyclic compound of the pyridine series selected from the group consisting of pyridine, quinoline, isoquinoline, and C-methyl homologs thereof, in the presence of substantially one mole of halogen hydride at an elevated temperature, the heterocyclic compound being applied in an amount substantially equivalent to the halogen hydride, and usually in excess thereof, i. e., the reaction being conducted in presence of the free base.

It is well known that certain monocarboxy organic acids containing eight carbon atoms or more, and not more than 32 carbon atoms, are characterized by the fact that they combine with alkalis to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

As to a description of this type of compound, and particularly examples derived from cocoanut oil and cocoanut oil fatty acids, see U. S. Patent No. 2,242,211, dated May 20, 1941, to Haack.

Although any of the high molal monocarboxy acids can be converted into the hydroxy ethyl amides readily by reaction with monoethanolamine, or by other conventional procedure, for instance, reaction of the amide with one mole of ethylene oxide, it is our preference to employ hydroxyethyl amides derived from the higher fatty acids, rather than from petroleum acids, rosin acids, and the like. We have found that by far the most effective demulsifying agents are obtained from unsaturated fatty acids having 18 carbon atoms. Such unsaturated fatty acids include the fatty acids, such as oleic acid, ricinoleic acid, linoleic acid, linolenic acid, etc. One may employ mixed fatty acids, as, for example, the fatty acids obtained from hydrolysis of cottonseed oil, soyabean oil, corn oil, etc. Our preferred demulsifier is obtained from unsaturated fatty acids, and more especially, unsaturated fatty acids containing a hydroxyl radical, or unsaturated fatty acids which have been subjected to an oxidation or oxyalkylation step, such as oxyethylation.

In view of what has been said, and particularly by reference to the aforementioned patent, it will be noted that compounds of the type herein contemplated as demulsifiers, may be indicated by the following formula:

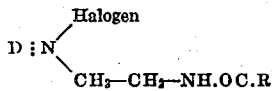

in which the acyl radical RCO is derived from a monocarboxy detergent-forming acid having at least 8 carbon atoms and not more than 32 carbon atoms; and D:N represents a heterocyclic compound of the pyridine series consisting of pyridine, quinoline, isoquinoline, and C-methyl homologs thereof. The halogen, of course, is most suitably chlorine or bromine; but iodine may be employed except for its excessive cost. More correctly D:N is contemplated as a radical, rather than a compound.

A demulsifying agent of the kind herein employed may be exemplified by the following examples:

*Example 1*

500 g. of a fatty acid ethanolamide, obtained by reaction of split cocoanut oil (containing all the natural acids, beginning with the capyrlic up to the stearic acid, and some oleic acid) with monoethanolamine, 330 g. hydrochloride of a fraction of pyridine bases (50% distilling up to 140° C., 90% distilling up to 160°, completely soluble in water) and 100 g. of the mixture of the free pyridine bases, are heated at 100° C. until the product is, for the most part, soluble in water and stable towards diluted sodium carbonate solution. After being separated from the primary compounds not reacted upon, the mixture of pyridinium-, picolinium- and other homologous pyridinium compounds obtained, may be further worked up to form a 10% watery solution.

When working at 150–160°, the reaction is more rapid.

Furthermore, pure pyridine may be used instead of a mixture of pyridine bases.

(Compare with Example 2 of the aforementioned Haack Patent No. 2,242,211.)

*Example 2*

Hydroxyethyl ricinoleoamide derived by reaction between ricinoleic acid and monoethanolamine is substituted for the amide employed in Example 2, preceding.

*Example 3*

A drastically oxidized castor oil having approximately the following characteristics:

| | |
|---|---|
| Acid number | 13.2 to 25.0 |
| Saponification number | 230.5 to 274.0 |
| Iodine number | 43.5 to 55.0 |
| Acetyl number | 164.0 to 192.0 |
| Hydroxyl value | 188.0 to 220.0 |
| Percent unsaponifiable matter | 1.1 |
| Percent nitrogen | 0.0 |
| Percent SO₃ | 0.0 |
| Percent ash | Trace | is converted into the hydroxyethyl amide by reaction with monoethanolamine. Such amide as substituted for the amide employed in Example 1, preceding.

*Example 4*

One pound mole of castor oil is treated with three pound moles of ethylene oxide in the presence of one-half of 1% of sodium ricinoleate as a catalyst at a temperature of 100–200° C. at a gauge pressure of 100 pounds and less than 300 pounds, so as to produce an oxyethylated tricinolein. Such ester is converted into the monoethanolamide by any conventional procedure. Note, for instance, the method of producing the amide employed in the preceding example. Such amide is employed instead of the amide described in Example 1, preceding.

*Example 5*

Phenylstearic acid is prepared in any suitable manner, as, for example, in the manner described in U. S. Patent No. 2,081,075, dated May 18, 1937, to Vobach. This is converted into phenylstearic hydroxyethyl amide, and such amide employed in the manner described in Example 1, preceding.

The manufacture of the above compounds is usually conducted with an excess of the pyridinium base halide, such as the hydrochloride, or hydrobromide, and usually in the presence of a significant amount of the free pyridinium base itself. In many instances, however, there is no need to use an excess of the pyridinium base halide, and, in fact, no need to have present any of the free pyridinium base itself, or, at the most, only a trace of the free base.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids or the well at the bottom of the well or at some point prior to the emergence of said well fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

We are aware of another type, or series of types of substituted pyridinium compounds analogous in certain respects to those herein contemplated as demulsifiers. As far as we are now aware, these other types are new compositions of matter. They are obtained by the removal of the secondary hydroxyl group of an acyl radical, instead of the removal of the primary hydroxyl of a hydroxy ethyl radical. In both instances the removal takes place by elimination of water in conjunction with the hydrogen atom of pyridine hydrochloride, or its equivalent.

Having thus described our invention, what we claim as new and desire to secure by Letters Patent is:

1. A process for breaking petroleum emulsions of the water-in-oil type, which consists in subjecting the emulsion to the action of a demulsifier comprising a chemical compound of the following formula type:

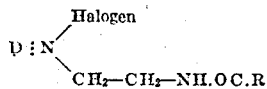

in which the acyl radical R.CO is derived from a monocarboxy detergent-forming acid having at least 8 and not more than 32 carbon atoms, and D:N represents a radical derived from a heterocyclic compound of the pyridine series consisting of pyridine, quinoline, isoquinoline, and C-methyl homologs thereof.

2. A process for breaking petroleum emulsions of the water-in-oil type, which consists in subjecting the emulsion to the action of a demulsifier comprising a chemical compound of the following formula type:

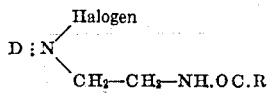

in which the acyl radical R.CO is derived from a higher fatty acid having at least 8 and not more than 32 carbon atoms, and D:N represents a radical derived from a heterocyclic compound of the pyridine series consisting of pyridine, quinoline, isoquinoline, and C-methyl homologs thereof.

3. A process for breaking petroleum emulsions of the water-in-oil type, which consists in subjecting the emulsion to the action of a demulsifier comprising a chemical compound of the following formula type:

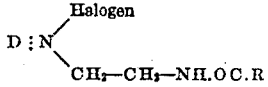

in which the acyl radical R.CO is derived from a higher unsaturated fatty acid having at least 8 and not more than 32 carbon atoms, and D:N represents a radical derived from a heterocyclic compound of the pyridine series consisting of pyridine, quinoline, isoquinoline, and C-methyl homologs thereof.

4. A process for breaking petroleum emulsions of the water-in-oil type, which consists in subjecting the emulsion to the action of a demulsifier comprising a chemical compound of the following formula type:

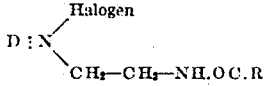

in which the acyl radical R.CO is a ricinoleyl radical, and D:N represents a radical derived from a heterocyclic compound of the pyridine series consisting of pyridine, quinoline, isoquinoline, and C-methyl homologs thereof.

MELVIN DE GROOTE.
BERNHARD KEISER.